United States Patent [19]

Aird et al.

[11] 3,739,463

[45] June 19, 1973

[54] METHOD FOR LEAD ATTACHMENT TO PELLETS MOUNTED IN WAFER ALIGNMENT

[75] Inventors: Alanson D. Aird; Sami I. Gabrail, both of Syracuse, N.Y.

[73] Assignee: General Electric Company, Owensboro, Ky.

[22] Filed: Oct. 18, 1971

[21] Appl. No.: 190,249

Related U.S. Application Data

[63] Continuation of Ser. No. 838,213, July 1, 1969, abandoned.

[52] U.S. Cl. ...................... 29/580, 29/591, 29/471.1

[51] Int. Cl. .............................................. B01j 17/00

[58] Field of Search .................... 29/580, 589, 591, 29/571.1, 571.3

[56] References Cited

UNITED STATES PATENTS

| | | | |
|---|---|---|---|
| 3,661,316 | 5/1972 | Kulicke | 29/589 |
| 3,668,770 | 6/1972 | Husni | 29/471.1 |
| 3,670,396 | 6/1972 | Lindberg | 29/471.1 |
| 3,698,074 | 10/1972 | Helda | 29/471.1 |

*Primary Examiner*—Charles W. Lanham
*Assistant Examiner*—W. Tupman
*Attorney*—Carl O. Thomas, Robert J. Mooney, Nathan J. Cornfeld et al.

[57] ABSTRACT

A semiconductor wafer is sub-divided into pellets and the pellets held in their wafer alignment by using a molding compound to form a holder for the pellets. A heated bonding tool is aligned with and used to simultaneously bond a set of external leads to each semiconductor pellet in sequence. Each pellet after the external leads are bonded thereto is lifted from the holder by the leads.

10 Claims, 10 Drawing Figures

INVENTORS:
ALANSON D. AIRD,
SAMI I. GABRAIL,
BY Carl O. Thomas
THEIR ATTORNEY.

INVENTORS:
ALANSON D. AIRD,
SAMI I. GABRAIL,

BY Carl O. Thomas

THEIR ATTORNEY.

METHOD FOR LEAD ATTACHMENT TO PELLETS MOUNTED IN WAFER ALIGNMENT

This application is a continuation of our earlier filed, copending application Ser. No. 838,213, filed July 1, 1969, now abandoned and is related to commonly assigned application Ser. No. 17,012, filed Mar. 6, 1970, now U.S. Pat. No. 3,689,991.

This invention relates to improvements in the manufacture of semiconductor devices such as transistors and monolithic integrated circuits. More particularly, the invention relates to improved apparatus and procedures facilitating the attachment of external leads to metallic contact regions on the semiconductor bodies of such devices with mass production techniques involving a minimum of direct labor.

In the art of manufacturing semiconductor devices such as transistors and monolithic integrated circuits, techniques for batch-fabrication of such devices in slices or wafers or layers of semiconductor material have been refined to a high degree. These techniques not only insure desirable uniformity of devices in the batch, but greatly reduce the handling and other direct labor involvement per device, with resultant achievement of very low manufacturing cost for the semiconductor body portion of each device. Even the application of metallic contact materials or pads to selected contact areas on the semiconductor body which may subsequently have external connectors secured to them, is now accomplished by batch fabrication techniques and at very low cost per device.

In spite of these previously achieved savings by the use of batch-fabrication techniques, in various manufacturing steps subsequent to the application of metallic contacts substantial additional costs have been incurred using prior art techniques. For example, heretofore the attachment of external electric connectors to the appropriate metallic contact pads on the semiconductor body portion of each device usually required substantial amounts of direct labor. This direct labor is involved in performing such tasks as subdividing the wafer or otherwise processing it to extract from it the semiconductor body portion of each individual device, manipulating the individual semiconductor body into a desired position at a work station, bringing the necessary external electrical connectors into cooperative relationship or registry with the minute metallic contact pads on the individual semiconductor body, and properly mechanically and electrically securing the connectors to the contact areas. On the basis of cost per finished device, such direct labor involving steps as above described represent a substantial portion of total device cost, and hence much thought and effort has been directed to the problem of reducing the cost of these steps.

Accordingly, one object of this invention is to provide an improved method and apparatus facilitating low-cost, minimum-labor attachment of external electrical connectors to the metallic contacts on bodies of semiconductor material, which bodies have been previously formed as increments of an integral wafer of such semiconductor material.

Another object is to provide a method and apparatus facilitating processing of a wafer of semiconductor material, which wafer has been previously treated to form therein a plurality of individual useful increments each constituting the semiconductor body portion of an individual semiconductor device, so as to subdivide said wafer into separate individual semiconductor body portions while preserving each separated semiconductor body portion precisely in the exact position, relative to its neighbors, that it occupied in the undivided parent wafer.

Another object of this invention is to provide an improved method and apparatus for presenting at a work station a plurality of discrete, individual pellets of semiconductor material, which originally together constituted a single integral parent wafer of semiconductor material, without changing the relative position or orientation of any of the pellets from the location and orientation they had in the original wafer prior to the subdivision of such wafer into pellets.

These and other objects of this invention will be apparent from the following description and the accompanying drawings, wherein.

Briefly, this invention relates to semiconductor lead attachment and is particularly useful in applying external leads to contact areas formed on semiconductor pellets. In one approach the side walls of these pellets are precisely engaged with and located in a network of pellet-sized pockets formed in a pellet carrier. The pellets themselves are transferred into the carrier in such a way that they maintain the same relative position and orientation they occupied in a previously subdivided parent wafer. This is accomplished by using the subdivided wafer having spacings between its individual pellets as a mold for forming the pellet carrier. The carrier, containing the pellets, is then presented to a suitable lead attachment work station for attachment of the external leads to the contact areas. The attachment is accomplished by placing the leads between a suitable bonding tool and the contact areas on an individual pellet. The tool is then brought into engaging relationship with the leads and the contact areas thereby joining them together. The bonding tool is then removed and a lifting action is applied to the leads thereby causing the pellet to be lifted out of its pocket in the carrier. The bonding tool and the carrier are relatively indexed laterally so as to bring at least one fresh pellet into vertical registry with the bonding tool and the bonding cycle is repeated until all the pellets have had their leads attached.

Figure 1:
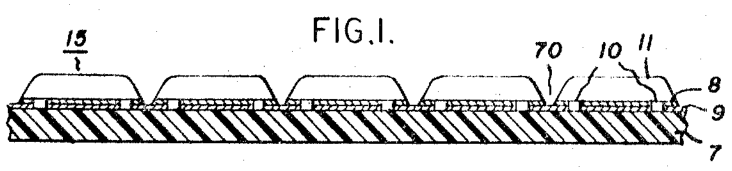
FIG. 1 is a fragmentary cross-sectional view of a portion of a wafer of a type to which this invention is particularly applicable, the wafer being secured to a suitable support and having been suitably subdivided into pellets.

FIG. 1 is an enlarged fragmentary cross-sectional view of a subdivided semiconductor wafer 15 comprising a plurality of semiconductor pellets 11 having grooves or spacings 70 therebetween. The techniques used for forming these grooves are known to those skilled in the art such as, sawing; photo resist masking and etching; and scribing, breaking, and etching. Although these grooves 70 may have a variety of shapes, a V-shape groove wider at the bottom surface of the pellets is preferred. The V-shaped grooves 70 may be formed by initially scribing a semiconductor wafer into pellets and securing the wafer to a support member. A bending force is then applied to the wafer thereby fracturing the wafer into individual pellets along the scribe lines. Next, the scribed and broken wafer is wrapped around a mandrel thereby forming V spacings between the pellets. Finally, the wafer while in this wrapped position is placed in an etchant solution to remove sufficient semiconductor material from the side walls of the pellets to permanently form the V-shaped grooves. For a more detailed discussion of how to form V-shaped grooves see Sami Gabrail's co-pending application, Ser. No. 812,182, filed on Apr. 1, 1969 and assigned to the present assignee of this invention.

The pellets 11 are secured, top face down, to a thin flexible shim 7 made of a material such as Mylar silicone rubber or the like by a resilient and etch-resistant adhesive layer 9. The material for layer 9 may be, for example, a petroleum jelly-plasticized apiezon wax. A suitable formulation for such a wax composition is, in parts by weight, two parts petroleum jelly, two parts xylene, and eight parts apiezon wax. A portion of the top surface of each pellet 11 is coated by a suitable known protective insulating layer 8 which may be, for example, silicon dioxide, silicon nitride, or a combination of both. Contact pads 10 of any suitable metallic contact material are provided on the surface of desired regions 1 and 3, best shown in FIG. 1A, previously formed on the pellet 11 for cooperation with other regions 2, 4, 5, etc. to form diodes, transistors, resistors or the like.

Figure 1A:
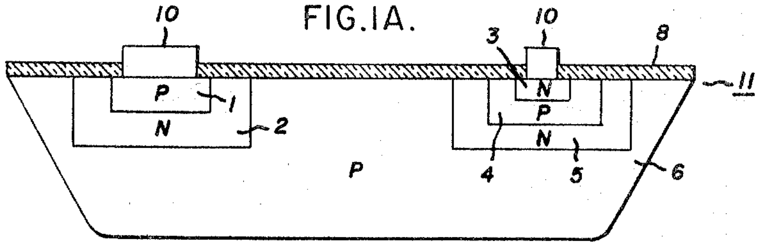
FIG. 1A is an enlarged cross-sectional view of a single pellet contained in the subdivided wafer shown in FIG. 1.

For ease of illustration and understanding of the invention, elements 1, 2, 3, 4, 5 are not shown in other than FIG. 1A. However, a portion of a monolithic bipolar integrated circuit is shown in FIG. 1A to illustrate a typical semiconductor structure comprising circuit elements to which this invention is particularly applicable. Of course, it is recognized that the active elements formed in pellet 11 may also be a variety of discrete semiconductor elements such as bipolar and unipolar transistors, diodes, thyristors, limited space-charge accumulation elements and the like.

The two circuit elements illustrated as embodied in the semiconductor pellet 11 of FIG. 1A are a PN diode including a P-type conductivity anode region 1 and a N-type conductivity cathode region 2, and a NPN transistor including a N-type conductivity emitter region 3, a P-type conductivity base region 4 and a N-type conductivity collector region 5. The P-type conductivity substrate 6 is used to isolate at least the two above-mentioned circuit elements by diode substrate isolation techniques. The planar junctions of the circuit elements are protected by a protective insulating layer 8. Contact pads 10 are formed on the top surface of the device to provide a means for subsequent bonding to external leads, not shown in FIG. 1A. The manufacture of the portions of the semiconductor pellet 11 thus far described will not be disclosed in detail inasmuch as it does not form a part of this invention and is also well known to those skilled in the art. Moreover, it will be understood that, in addition to active elements such as transistors and diodes, passive elements such as resistors and capacitors may be fabricated within the pellet 11 and included in the circuit, although such are not shown in FIG. 1A.

Figure 2:
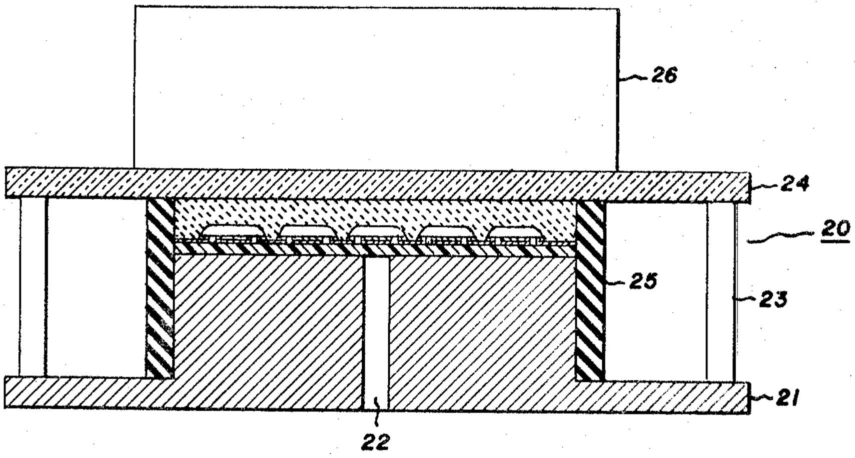
FIG. 2 is a cross-sectional view of an apparatus useful in the practice of the present invention for forming a semiconductor pellet carrier.

Once the wafer 15 is subdivided as shown in FIG. 1 it is utilized as a precision mold for the formation of a pellet carrier 12 comprising a plate or web having a plurality of pellet-sized pockets or retainer means wherein each pocket intimately engages the side walls of an individual pellet 11. This is accomplished as shown in FIG. 2 by pouring a homogeneous, dimensionally stable (i.e., will not appreciably expand or contract during solidification), quick hardening (less than 1 hour), thermally stable up to at least 300° C material 12 around the exposed surfaces of the subdivided pellet 11. Though a number of materials such as epoxy resins, lime, silicone rubber, clay or the like may be used for carrier 12, preferably, calcium sulphate hemihydrate is used because of its excellent dimensional stability and its ability to solidify very rapidly from a liquid slurry to a solid. This material is commercially available, for example, under the trademark "Duroc" from the Ranson and Randolph Company of Toledo, Ohio.

Figure 3:
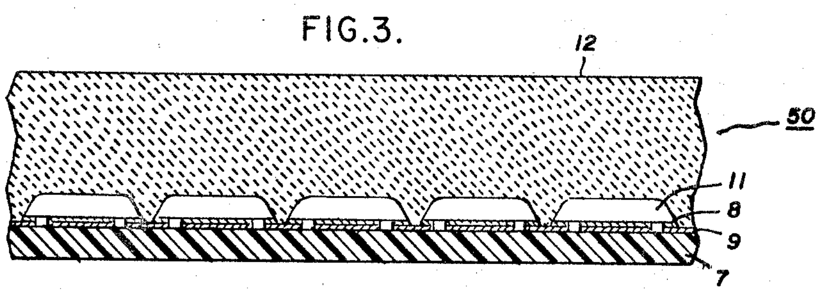
FIG. 3 is a cross-sectional view of the subdivided wafer shown in FIG. 1 after completion of processing in the apparatus shown in FIG. 2.

One detailed example will now be described of a suitable method for forming the semiconductor pellet carrier 12 as shown in FIG. 3. FIG. 2 shows a cross-sectional view of the preferred means 20 used in the initial molding step in the invention to form the pellet carrier 12. The base 21 of the mold 20 which may be, for example, made of aluminum has a hole 22 through its center to allow a vacuum to be applied to the outer surface of the shim 7. Attached to the base 21 are four posts 23 which are used to support a slide 24 of a material such as glass. Completely surrounding the cylindrical part of the base 21 is a flexible molding material 25 such as silicone rubber material. This material 25 extends above the top surface of the cylindrical part of the base 21 to a height desired as the thickness of the pellet carrier 12.

At this point, the secured subdivided wafer 15 shown in FIG. 1 is placed shim side down onto the top surface of the base 21. It should be noted that the edges of the shim are contiguous with the surface of the molding material 25. Thus when the mixture of calcium sulphate hemihydrate 12 is poured onto the exposed surface of the subdivided pellet 11 it flows into the grooves 70 between them and completely fills the rest of the cavity formed by the extended sides of the molding material 25. The glass slide 24 is then placed on top of the four posts 23 thereby confining the material 12 forming the pellet carrier 12 to its desired dimensions. A weight 26 may then be placed on top of the glass slide 24 to maintain the slide 24 flush with the four posts 23 and the top surface of the extended portions of molding material 25.

It should be noted that the Duroc in the mixture 12 absorbs water and during the solidification process thereby expands filling the spaces between the pellets 11. A preferred composition of mixture 12 is 10 grams Duroc per about 3 milliliters of water. At room temperature, this composition takes about 15 minutes to solidify after being poured into the grooves 70. It will be, of course, appreciated that there are other methods of confining the material 12 to the grooves 70 by using other types of mold designs.

Figure 4:
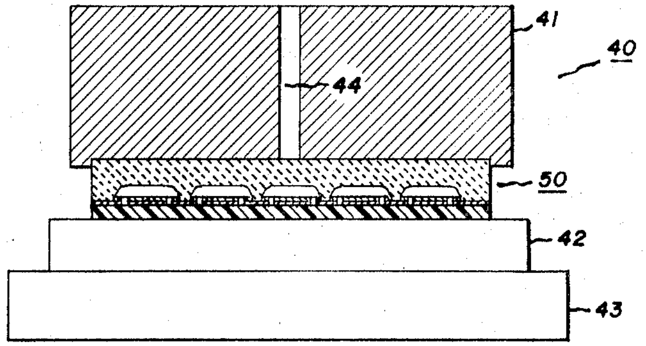
FIG. 4 is a cross-sectional view of another apparatus useful in the practice of this invention.
Figure 5:
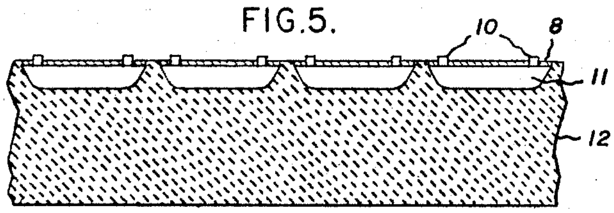
FIG. 5 is an enlarged fragmentary cross-sectional view of the subdivided wafer shown in FIG. 1 after it has been received by the pellet carrier in accordance with this invention.

Following the solidification of the mixture 12 the layer of wax 9 and the shim 7 are removed. This can be accomplished in a number of ways but a preferred method entails the use of the means 40 shown in FIG. 4. The pellet carrier portion 12 of the pellet carrier assembly 50 (shown separately in FIG. 3) is secured in a clamp 41 by use of a vacuum applied through an opening 44 in the center of the clamp. In this configuration the shim 7 faces downward still secured to the pellets 11 by the wax layer 9. After the pellet carrier assembly 50 is attached to the clamp 41, it is lowered onto a sand blasted quartz plate 42 which rests on a hot plate 43. The shim 7 and the wax layer 9 are then heated to a sufficient temperature to melt the wax and allow the shim to be removed. The wax layer 9 is then also removed by rinsing the assembly 50 in a suitable solvent such as hot trichlorethylene, methanol or a combination of both. If desired, the durability of the pellet carrier 12 can be improved by heating it to about 125° C for 15 minutes. FIG. 5 shows an enlarged fragmentary cross-sectional view of pellets 11 secured in the pellet carrier 12.

Figure 6:
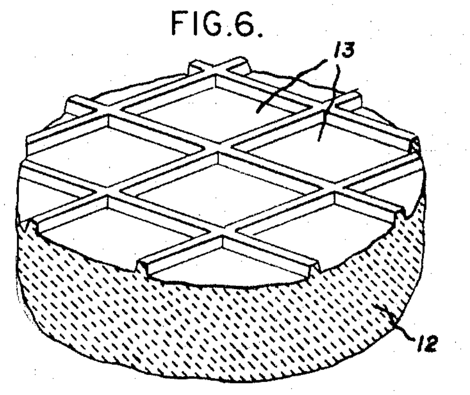
FIG. 6 is an enlarged fragmentary isometric view of a portion of the carrier of FIG. 5 after the removal of individual pellets therefrom.
Figure 7:
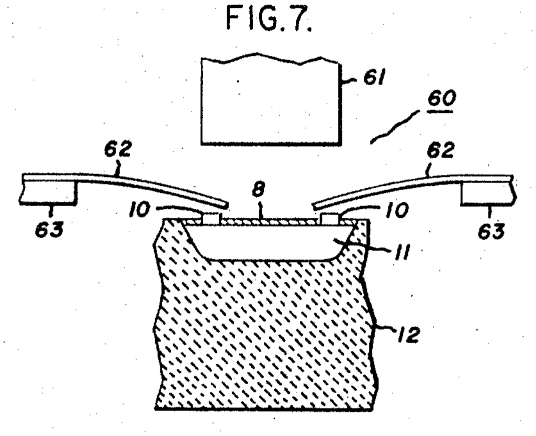
FIG. 7 is an enlarged fragmentary cross-sectional view of an apparatus useful in precisely attaching external leads to the contact pads of pellets supported by the carrier of FIG. 5.
Figure 9:
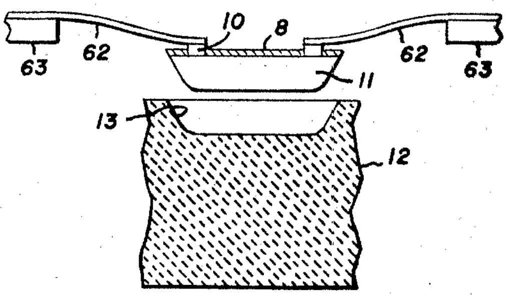
FIG. 9 is another view, similar to FIGS. 7 and 8, of an individual pellet being removed from the pellet carrier upon completion of attachment of external leads to its contact pads.
Figure 8:
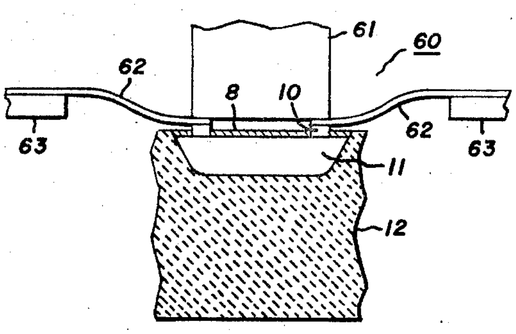
FIG. 8 is a view similar to FIG. 7 with the external leads brought into connection-forming contact with the contact pads of a pellet by a suitable bonding tool.

In accordance with the invention, the pellets 11 secured in the pellet carrier 12 as shown in FIG. 5 are presented at a suitable work station, pellet by pellet, for attachment of external leads to the respective contact pads 10 of each pellet. One suitable apparatus, useful in performing these steps is shown in FIGS. 7 – 9. FIG. 7 shows a fragmentary cross-sectional view of a portion of the pellet carrier 12 wherein the upstanding contact pads 10 located on the pellet 11 are in registration directly beneath a suitable vertically reciprocable thermal bonding tool 61. External leads 62, attached to a suitable support 63, are placed in registry between the tool 61 and the respective contact pads 10. The tool 61 is then lowered into engaging relationship with the leads 62 as shown in FIG. 8 thereby providing the means necessary to form a good bond between the leads 62 and the respective contact pads 10. A suitable feeding means known to those skilled in the art is used to provide a new set of external leads into bonding position with the contact areas as they are needed. Upon removal of the tool 61 as shown in FIG. 9 the pellet 11 with attached external leads 62 can then be easily removed from the pellet carrier 12 by a lifting action supplied by means associated with the lead-feeding means and applied to the leads 62 either manually or automatically. Then the bonding tool 61 and the pellet carrier 12 are relatively indexed laterally so as to bring the next pellet 11 into vertical registry with the bonding tool 61, and the bonding cycle as shown in FIGS. 7 – 9 is repeated again until all the individual pellets have had their leads attached. Due to the heat sometimes generated during the bonding operation the pellet carrier 12 should be able to withstand at least 300° C. FIG. 6 shows a portion of the pellet carrier 12 once the pellets 11 have been removed thus clearly showing the formation of the pellet-sized pockets 13.

It is, of course, recognized that any suitable means of bonding may be used to attached the leads. Further, the attachment of these leads may be accomplished either automatically or manually depending on preference. In addition, the number of leads attached can vary depending upon device requirements thereby requiring only slight modification in the location and number of tools used in the bonding mechanism.

Thus it will be evident that an important advantage of the present invention is that the pellets received in the pellet carrier are preserved in the original orientation they occupied in the parent wafer. This enables such pellets to be automatically precisely indexed relative to a work station at which leads are automatically bonded to contacts on each pellet, with a minimum involvement of direct labor, manual vernier positioning, and the like.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What we claim as new and desire to secure by Letters Patent of the United States is:

1. A process for fabricating a semiconductor device comprising
providing a semiconductor wafer containing a plurality of integrally joined semiconductor pellet portions with each of the pellet portions having a plurality of contact pads associated therewith,
sub-dividing the wafer to separate the pellet portions into discrete, laterally separated pellets,
during sub-dividing and thereafter mounting the pellets so that their original relative orientation in the wafer is preserved,
positioning a first set of external leads in registration with the contact pads present on one pellet,
simultaneously bonding each of the contact pads on the one pellet to each of the registered external leads, and
applying a lifting force to the external leads bonded to the one pellet to lift it from its laterally spaced, wafer aligned mounting with respect to adjacent pellets.

2. A process according to claim 1 in which during the step of sub-dividing V-shaped grooves are formed between adjacent pellets with the grooves progressively diminishing in width toward the major pellet surfaces carrying contact pads so that the pellets may be readily lifted from their mountings when external leads are attached.

3. A process according to claim 1 in which the step of mounting comprises molding a mounting material about the wafer so that the molding material is capable of holding the pellets in the desired alignment and maintaining the contact pads free of molding material to facilitate subsequent external lead attachment.

4. A process according to claim 1 in which the step of mounting is accomplished by the use of a molding material which can be heated to a temperature of 300°

C during external lead attachment without deleterious effect to the pellets.

5. A process according to claim 1 in which bonding is accomplished by bringing a heated bonding tool into engagement with only those portions of the external leads that overlie the one pellet and using the bonding tool to simultaneously heat the external leads and bring them into engagement with the contact pads.

6. A process according to claim 1 in which the mounted pellets remaining after removal of the one pellet are repositioned so that a second pellet, a second set of external leads, and a heatable bonding tool are brought into vertical alignment and the second set of external leads are bonded to the second pellet in a manner identical to the bonding of the first set of external leads to the one pellet.

7. A process according to claim 1 in which successive sets of external leads are sequentially bonded to the pellets with each pellet being removed from its mounting when bonding is completed.

8. A process according to claim 1 in which the pellet portions are located in a regularly spaced manner within the wafer and the pellets formed from the wafer are mounted to preserve the original wafer spacing.

9. A process according to claim 1 in which bonding is accomplished by bringing a heatable bonding tool into engagement with only those portions of the external leads that overlie the one pellet, aligning successive sets of external leads with the bonding tool in a desired vertical alignment, and successively indexing the pellets into vertical alignment with the bonding tool and external leads so that each set of external leads overlies the contact pads of an aligned pellet, the indexing being substantially simplified by reason of the retention by the pellets of their original wafer alignment.

10. A process for attaching external leads to each of a plurality of monolithic integrated circuits comprising providing a semiconductor wafer containing therein a plurality of regularly aligned identical monolithic integrated circuit portions with each of the monolithic integrated circuit portions having a plurality of contact pads associated therewith, sub-dividing the wafer to separate the monolithic integrated circuit portions into laterally spaced monolithic integrated circuits, mounting the monolithic integrated circuits so that their contact pads are exposed and accessible for bonding while at all times retaining the wafer alignment of the monolithic circuits with respect to each other, positioning each of the external leads for one monolithic integrated circuit in overlying relation with the contact pads thereof, positioning a heatable bonding tool having a lateral extent substantially corresponding to that of the one monolithic integrated circuit so that it overlies the monolithic integrated circuit, each of its contact pads, and each of the external leads at the location at which they overlie the contact pads, moving the heatable bonding tool toward the monolithic integrated circuit so that all of the external leads are engaged by the bonding tool and simultaneously brought into engagement with the contact pads, simultaneously transferring heat from the bonding tool to each of the contact pads and external leads so that the external leads and contact pads are bonded together simultaneously at their points of engagement, removing the heatable bonding tool from engagement with the external leads, applying a lifting force to the external leads bonded to the one monolithic integrated circuit to lift it from its laterally spaced, wafer aligned mounting with respect to adjacent identical monolithic integrated circuits, and in like manner bonding additional external leads to additional monolithic integrated circuits by successively bringing additional external leads and additional mounted monolithic integrated circuits into alignment with the heatable bonding tool.

* * * * *